UNITED STATES PATENT OFFICE 2,601,237

CARBOXYPHENYLPOLYSILOXANES

Arthur J. Barry and John W. Gilkey, Midland, Mich., assignors to Dow Corning Corporation, Midland, Mich., a corporation of Michigan No Drawing. Application July 5, 1949, Serial No. 103,175

6 Claims. (Cl. 260—46.5)

This invention relates to carboxyphenylsiloxanes.

It is the purpose of this invention to increase the utility of organopolysiloxanes by including therein siloxane units which have carboxyphenyl groups attached to the silicon atoms. The presence of such groups in siloxanes provides polar centers and thereby increases the attractive forces between the molecules. Another object of the invention is to provide water soluble siloxane resins. Other objects and advantages will be apparent from the following description.

This invention relates to organopolysiloxanes having a degree of substitution of from 0.5 to 3 organic radicals per silicon atom. The organic radicals are selected from the group consisting of carboxyphenyl, tolyl, phenyl and methyl radicals. In the polysiloxane there is from one carboxyphenyl radical per 4000 silicon atoms to one carboxyphenyl radical per silicon atom.

The polysiloxanes of this invention include both homopolymers and copolymers. The homopolymers within the purview of this invention are of the type $(HOOCC_6H_4SiO_{3/2})_n$, $(HOOCC_6H_4RSiO)_n$ and $(HOOCC_6H_4R_2Si)_2O$ in which R is tolyl, phenyl or methyl.

The copolymers may be composed of any combination of the above siloxanes. In addition, the copolymers may be composed of siloxane units of the above type in combination with the following siloxane units $SiO_2$, $CH_3SiO_{3/2}$, $C_6H_5SiO_{3/2}$, $CH_3C_6H_4SiO_{3/2}$, $(CH_3)_2SiO$, $(C_6H_5)_2SiO$, $(CH_3C_6H_4)_2SiO$, $CH_3(C_6H_5)SiO$ $CH_3(CH_3C_6H_4)SiO$ and $C_6H_5(CH_3C_6H_4)SiO$ and siloxane units of the type $R_3SiO_{1/2}$ where the R's are any combination of phenyl, methyl and tolyl radicals.

In all cases the degree of substitution of the siloxanes is from 0.5 to 3 organic radicals per silicon atom and the number of carboxyphenyl radicals present in the siloxanes is such that the ratio of carboxyphenyl to silicon is from 1 to 4000 to 1 to 1.

The carboxyphenylsiloxanes of this invention may be prepared by any appropriate method. One such method is by the oxidation of tolyl siloxanes under conditions whereby the methyl group of the tolyl radical is converted to a carboxyl group. The reaction may be represented by the equation

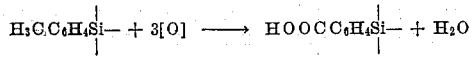

One method of oxidizing tolyl groups to carboxyphenyl groups is by adding a tolyl siloxane to an aqueous solution of an alkali metal hydroxide and $KMnO_4$. The mixture may then be refluxed for one to five hours. The solution is filtered to remove manganese dioxide and any solid unreacted tolyl siloxane. The carboxyphenylsiloxane is obtained upon acidification of the filtrate. If desired, a solvent such as benzene may be employed during the reaction.

Another method by which carboxyphenylsiloxanes may be prepared is by the preparation of Grignard reagents from halogenophenylsiloxanes. In this method the halogenophenylsiloxane is reacted with magnesium and the Grignard reagent thus formed is carbonated with carbon dioxide. The carboxyphenyl derivative is obtained upon acidification of the carbonated product. This method is particularly adaptable for the preparation of carboxyphenylsiloxanes of the type $(HOOCC_6H_4R_2Si)_2O$.

Copolymers containing carboxyphenylsiloxanes and methyl, tolyl or phenyl siloxanes may be prepared by oxidizing the tolyl groups of copolymers containing tolyl siloxane units. The oxidation may be carried out in a variety of ways which include air blowing at elevated temperatures in the presence of a metallic oxide catalyst such as $MnO_2$ and $Cr_2O_3$ and oxidation by the above described permanganate method. Alternatively, copolymers containing carboxyphenylsiloxane units and other type siloxane units, may be prepared by catalytic copolymerization of carboxyphenylsiloxanes with alkyl and aryl siloxanes. Catalysts for such copolymerization include alkali metal hydroxides, acids, alkali metal salts of organo silanols, alkali metal alkoxides and salts of carboxylic acids.

Carboxyphenylsiloxanes have thermal stabilities comparable with those of phenyl and methyl siloxanes. The materials may be in the form of solids or liquids. The carboxyphenylsiloxanes are soluble in dilute alkali metal hydroxide solution, concentrated $NH_4OH$ and organic amines.

The compounds of this invention are useful per se for lubricants, high temperature resins and coating agents.

Carboxyphenylsiloxanes are also useful as intermediates in the preparation of resins of the polyester and polyamide type. This may be accomplished by reacting polyhydric alcohols and diamines respectively with the carboxyphenylsiloxanes. For example, 1,3-carboxyphenyltetramethyldisiloxane has been reacted with ethylene diamine to produce a copolymeric resin.

This material can be drawn out into thread-like strands. A similar reaction product was obtained by reacting ethanolamine and 1,3-di-p-carboxyphenyltetramethyldisiloxane.

The reaction between carboxyphenylsiloxanes and polyfunctional amines is accomplished by mixing the two and heating the mixture at a temperature above 100° C. Useful products are obtained when the copolymers so formed have compositions ranging from 1 part by weight amine to 200 parts by weight siloxane to 2.5 parts by weight amine per part by weight siloxane.

The following examples are illustrative only.

*Example 1*

A mixture of 71.5 g. of tolyl silsesquioxane, 400 g. of NaOH, 267 g. of KMnO$_4$, and 6000 cc. of water was placed in a 10 qt. pail. The mixture was agitated and boiled for 1½ hours. During this time the color of the mixture changed from purple to green. 80 cc. of ethanol was added and the mixture was filtered to remove unreacted tolyl silsesquioxane and MnO$_2$. Upon acidification of the filtrate with concentrate HCl, 35.6 g. of a white friable material was obtained. This material was shown by analysis to be a copolymer having the composition 3HOOCC$_6$H$_4$SiO$_{3/2}$ and 1SiO$_2$. The neutral equivalent of the copolymer was 195.

*Example 2*

23.8 g. of tolyl silsesquioxane was dissolved in 200 cc. of benzene and the solution was added to a solution of 133 g. of NaOH and 89 g. of KMnO$_4$ in 2000 cc. of water. The mixture was refluxed for 2 hours during which time the color of the mixture changed from purple to green. The benzene was removed by distillation and the aqueous solution was filtered to remove unreacted tolyl silsesquioxane and MnO$_2$. Upon acidification of the filtrate with HCl solid carboxyphenyl silsesquioxane precipitated. The precipitate had a neutral equivalent of 176. The theoretical value for carboxyphenyl silsesquioxane is 173.

*Example 3*

75 g. of tolylmethylsiloxane was dissolved in 200 cc. of benzene and oxidized by the method of Example 2. Upon acidification of the filtrate carboxyphenylmethylsiloxane was obtained in the form of a yellow solid. This solid was soluble in concentrated NH$_4$OH.

*Example 4*

134 g. of a copolymer having the composition 35 mol percent CH$_3$C$_6$H$_4$SiO$_{3/2}$ and 65 mol percent CH$_3$SiO$_{3/2}$ was ground into a powder. The powder was then refluxed for 3 hours in a solution consisting of 4000 cc. of water, 400 g. of NaOH and 268 g. of KMnO$_4$. The solution was filtered to remove MnO$_2$ and unreacted resin, and the filtrate was acidified with concentrated HCl. Thereupon 64.5 g. of a copolymer containing carboxyphenylsiloxane units, monomethylsiloxane units and SiO$_2$ was obtained. This material was soluble in concentrated NH$_4$OH.

*Example 5*

A copolymer having the composition 33⅓ mol percent CH$_3$C$_6$H$_4$SiO$_{3/2}$, 33⅓ mol percent (CH$_3$)$_2$SiO and 33⅓ percent CH$_3$SiO$_{3/2}$ was oxidized as follows. 142 g. of the resin was dissolved in an equal weight of benzene and the solution was added to a solution of 400 g. NaOH and 268 g. of KMnO$_4$ in 4500 cc. of water. The mixture was refluxed for 1½ hours. The solution was filtered and acidified with HCl whereupon 49.8 g. of a white solid was obtained. This material was a copolymer of carboxyphenylsiloxane, dimethylsiloxane and monomethylsiloxane. The copolymer was soluble in concentrated NH$_4$OH.

*Example 6*

A copolymer having a composition of 25 mol percent CH$_3$C$_6$H$_4$SiO$_{3/2}$, 70 mol percent (CH$_3$)$_2$SiO and 5 mol percent C$_6$H$_5$(CH$_3$)$_2$SiO$_{1/2}$ was prepared by the hydrolysis of the corresponding chlorosilanes. The fluid copolymer in amount such that 0.29 g. mols of tolyl siloxane was present, was refluxed 4 hours with a solution of 189.6 g. of KMnO$_4$ and 282 g. of NaOH in 4500 cc. of water. The solution was filtered. Upon acidification a gummy substance which hardened on oven drying to a grainy powder was obtained. This material was shown by analysis to be a copolymer of carboxyphenylsiloxane, dimethylsiloxane and phenyldimethylsiloxane. The copolymer was soluble in concentrated NH$_4$OH.

*Example 7*

15 g. of tolylmethylsiloxane in pyridine solution was refluxed 15 minutes with 0.95 g. of KMnO$_4$. Water was added and the pyridine was steam distilled. The aqueous solution was filtered and the filtrate was extracted with benzene. The benzene solution was acidified with HCl and then washed neutral. Upon evaporation of the solvent a cloudy fluid was obtained. The fluid was a copolymer of tolylmethylsiloxane and carboxyphenylmethylsiloxane in which, as shown by its neutral equivalent of 700,000, there was one carboxyphenyl radical per 3900 silicon atoms.

To a 2 g. sample of the fluid copolymer, one drop of glycerol was added. The mixture was heated 25 hours at 180° C. whereupon the material set to a soft gel. A sample of the copolymer containing no glycerine was unchanged after 25 hours at 180° C.

*Example 8*

222 g. of tetramethyl, 1,3 di-p-bromophenyldisiloxane was added over a period of 3 hours to 44 g. of magnesium shavings in 500 ml. of anhydrous ether. During addition of the disiloxane the reaction was exothermic enough to maintain a steady reflux. The Grignard reagent was added over a period of 80 minutes to a large excess of powdered, solid, carbon dioxide in 400 ml. of ether. The carbonated mixture hydrolyzed in dilute HCl. The ether layer was extracted with NaOH and upon acidification, 151 g. of a tarry, yellow fluid was obtained. This material was recrystallized twice from diethylbenzene whereupon a white powdery material melting at 243° C. to 244° C. was obtained. Analysis, X-ray and infrared examinations proved this material to be tetramethyl 1,3 di-p-carboxyphenyldisiloxane The neutral equivalent was found to be 189.8 while the calculated value is 187.24.

The salts of tetramethyl 1,3 di-p-carboxyphenyldisiloxane, were prepared and found to be as follows. The ammonium salt is a white powdery solid soluble in water. The sodium salt is a white water-soluble powdery solid. The copper salt is a blue water-insoluble solid. The iron salt is a rust-colored, water-insoluble solid.

*Example 9*

10 g. of tetramethyl, 1,3 di-p-carboxyphenyldisiloxane, 6 g. of KOH, 45 ml. of ethanol, 5 ml. of water and 25 g. of octamethylcyclotetrasiloxane were refluxed for 40 minutes. The mixture was cooled and acidified with hydrochloric acid. The mixture was extracted with ether and upon evaporation of the solvent a viscous yellow oil was obtained. This material was a copolymer composed of dimethylsiloxane units and carboxyphenyldimethylsiloxane units.

*Example 10*

Copolymers were prepared according to the method of Example 9 from octamethylcyclotetrasiloxane and carboxyphenylsilsesquioxane and from octamethylcyclotetrasiloxane and carboxyphenylmethylpolysiloxane. The neutral equivalents of these copolymer oils range from 19,000 to 54,000 showing that the copolymers contain from 1 carboxyphenyl group per 250 silicon atoms to one carboxyphenyl group per 750 silicon atoms.

That which is claimed is:

1. An organopolysiloxane having a degree of substitution of from 0.5 to 3 organic radicals per silicon atom, said radicals being selected from the group consisting of carboxyphenyl, tolyl, phenyl and methyl radicals, and in which polysiloxane there is from one carboxyphenyl radical per 4000 silicon atoms to one carboxyphenyl radical per silicon atom.

2. A polysiloxane having a degree of substitution from 0.5 to one organic radical per silicon atom, all of the organic radicals being carboxyphenyl radicals.

3. Carboxyphenylsilsesquioxane.

4. A copolymeric siloxane in which the siloxane units are of the formula $R_2SiO$, where R is selected from the group consisting of carboxyphenyl, tolyl, methyl and phenyl radicals, in which polysiloxane there is from one carboxyphenyl radical per 4000 silicon atoms to one carboxyphenyl radical per silicon atom.

5. A siloxane having the composition $$(HOOCC_6H_4SiR_2)_2O$$

where R is selected from the group consisting of phenyl, tolyl and methyl radicals.

6. Tetramethyl 1,3 di-p-carboxyphenyldisiloxane.

ARTHUR J. BARRY.
JOHN W. GILKEY.

REFERENCES CITED

The following references are of record in the file of this patent:

UNITED STATES PATENTS

| Number | Name | Date |
| --- | --- | --- |
| 2,397,727 | Daudt | Apr. 2, 1946 |
| 2,507,414 | MacKenzie | May 9, 1950 |

OTHER REFERENCES

Sommer et al., Journ. Amer. Chem. Soc., vol. 71, April 1949, p. 1509.